(No Model.)
R. B. LAMB.
Underground Conduit for Telegraphic Conductors.
No. 242,658. Patented June 7, 1881.
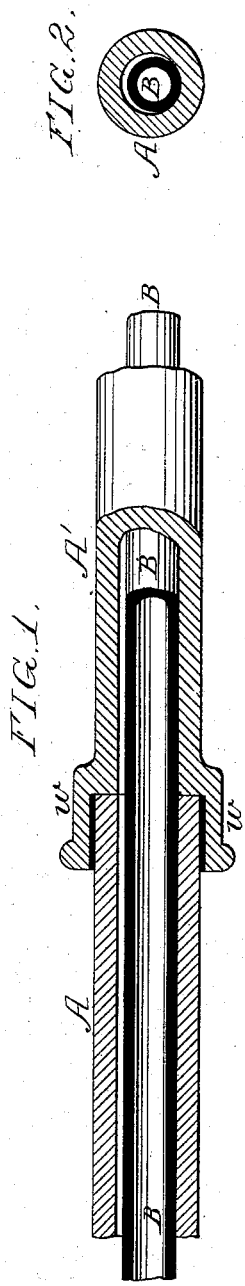
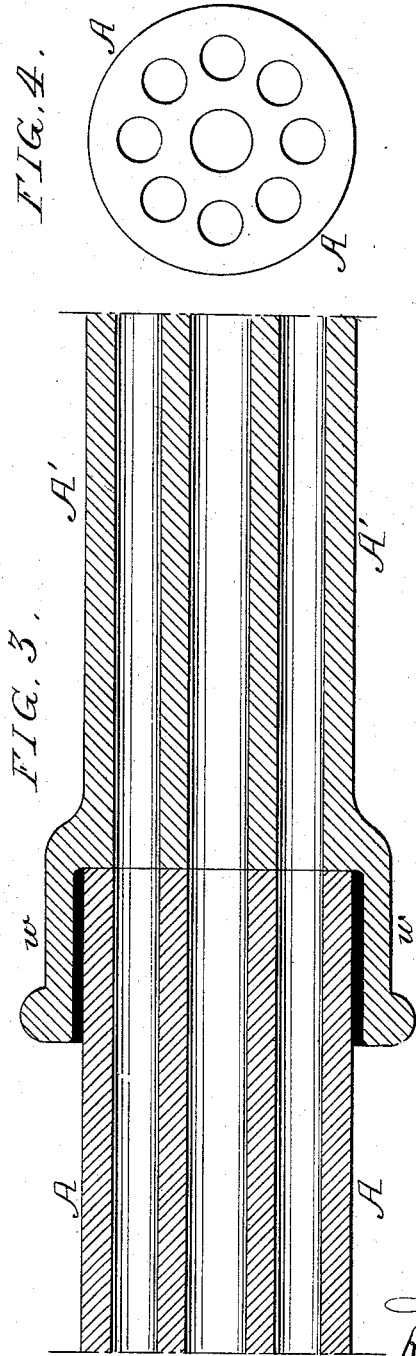
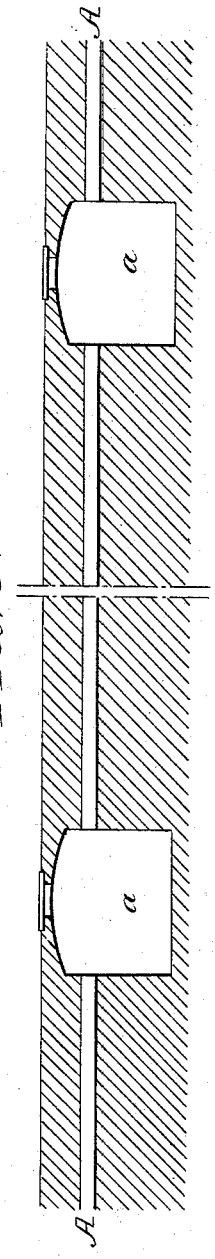
Witnesses:
James T. Tobin
Harry Smith
Inventor:
Restore B. Lamb
by his Attorneys
Howson and [?]

UNITED STATES PATENT OFFICE.

RESTORE B. LAMB, OF CAMDEN, NEW JERSEY, ASSIGNOR TO THE NATIONAL UNDERGROUND ELECTRIC COMPANY, OF SAME PLACE.

UNDERGROUND CONDUIT FOR TELEGRAPHIC CONDUCTORS.

SPECIFICATION forming part of Letters Patent No. 242,658, dated June 7, 1881.

Application filed May 5, 1881. (No model.)

*To all whom it may concern:*

Be it known that I, RESTORE B. LAMB, a citizen of the United States, residing in Camden, New Jersey, have invented certain Improvements in Underground Conduits for Telegraph-Conductors, of which the following is a specification.

My invention relates to certain improvements in the underground conduit for telegraph-wires for which Letters Patent No. 229,259 were granted June 29, 1880, the object of my present invention being to carry to greater perfection the invention described in the said patent.

In the accompanying drawings, Figure 1 represents, mainly in section, a portion of my improved underground conduit for a single telegraph wire or cable; Fig. 2, a transverse section of Fig. 1; Fig. 3, a portion of the underground conduit for a number of telegraph wires or cables; Fig. 4, a transverse section of Fig. 3; and Fig. 5, a diagram showing the mode of laying the underground conduit.

In Figs. 1 and 2, A A' are portions of united sections of pipes made of baked earthenware or terra-cotta, glazed or enameled internally and, by preference, externally. A rubber tube, B, passes through a series of these pipes A A', and within the tube is contained either a single telegraph-wire or a cable consisting of a number of insulated wires. The pipes are laid in a trench in the ground, and where great lengths have to be traversed the pipes terminate at water-tight vaults *a a*, made at suitable intervals apart—as, for instance, wherever one main street of a city crosses another main street. The rubber tube, which may be similar to the rubber hose used for domestic and other purposes, should be continuous from station to station, and it may be introduced into the terra-cotta pipes by pulling it through the latter as section after section is being laid, or it may be pulled through the pipes after the latter have been laid by means of a wire and suitable windlass in one of the vaults, and the telegraph wire or cable first introduced into the tube may be pulled with the latter through the terra-cotta pipes.

There are two objects in glazing or enameling the interior of the pipes. First, the glazing effectually prevents any moisture which might saturate the baked clay from gaining access to the rubber tube; and, second, the glazing renders the passages so smooth internally that the rubber tube can be easily drawn through them. It is always best to glaze the exterior as well as the interior of the pipes.

Dampness and exhalations from the soil have an injurious effect on rubber, hence the necessity of a tight joint where the sections of pipes are united. In the present instance the joints are made by forming at one end of each section a bell, *w*, for receiving the end of an adjoining section, and by packing with hydraulic cement or other appropriate material the annular space within the bell. If, after these precautions, there should be slight penetrations of moisture through the pipes at one or more distant points, it cannot seriously affect the rubber or prevent the latter from excluding such moisture from access to the telegraph wire or cable.

The water-proof conduit above described may be used for branch lines; but for main lines I use the blocks or sections of terra-cotta shown in Figs 3 and 4, each block having a number of passages, and each passage having a rubber tube for receiving a telegraph wire or cable.

Terra-cotta blocks with a number of passages have been heretofore proposed as conduits for telegraph-wires, and it has been suggested that the passages may be glazed; hence such blocks cannot be claimed independently of the continuous rubber tubes.

It may be stated that the vaults or stations are water-proof and are provided with water-proof covers.

I claim as my invention—

The within-described conduit for telegraph wires or cables, the same consisting of sections or blocks of baked clay or terra-cotta having a passage or passages glazed internally, in combination with a continuous rubber tube or tubes adapted to said glazed passage or passages, substantially as set forth.

In testimony whereof I have signed my name to this specification in the presence of two subscribing witnesses.

RESTORE B. LAMB.

Witnesses:
JAMES F. TOBIN,
HARRY SMITH.